United States Patent
Choi et al.

(10) Patent No.: US 9,580,008 B2
(45) Date of Patent: Feb. 28, 2017

(54) METHOD FOR WARNING BACK SIDE OF VEHICLE PROVIDED WITH REAR BUMPER MULTI CARRIER

(71) Applicant: Hyundai Motor Company, Seoul (KR)

(72) Inventors: Woo Young Choi, Seoul (KR); Hyun Gyung Kim, Hwaseong-si (KR); Dong Eun Cha, Suwon-si (KR); Seung Mok Lee, Osan-si (KR); Phil Jung Jeong, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 156 days.

(21) Appl. No.: 14/559,725

(22) Filed: Dec. 3, 2014

(65) Prior Publication Data
US 2016/0046230 A1    Feb. 18, 2016

(30) Foreign Application Priority Data

Aug. 14, 2014    (KR) .................. 10-2014-0105700

(51) Int. Cl.
| | |
|---|---|
| *H04N 7/18* | (2006.01) |
| *B60Q 1/30* | (2006.01) |
| *B60Q 9/00* | (2006.01) |
| *B60R 9/06* | (2006.01) |

(52) U.S. Cl.
CPC .............. *B60Q 1/30* (2013.01); *B60Q 9/005* (2013.01); *B60Q 9/006* (2013.01); *B60R 9/06* (2013.01)

(58) Field of Classification Search
CPC ....................................................... B60Q 1/30
USPC ................................ 340/903, 431, 432, 435
See application file for complete search history.

(56) References Cited

U.S. PATENT DOCUMENTS

| | | | |
|---|---|---|---|
| 2005/0104322 A1* | 5/2005 | Swannie | G01S 15/025 280/432 |
| 2008/0006665 A1 | 1/2008 | Bergerhoff et al. | |
| 2013/0038731 A1* | 2/2013 | Brey | B60R 11/04 348/148 |
| 2014/0022389 A1* | 1/2014 | Kageta | H04N 7/183 348/148 |
| 2014/0299642 A1* | 10/2014 | Schatz | B60R 9/06 224/496 |

FOREIGN PATENT DOCUMENTS

| | | |
|---|---|---|
| KR | 2007-0117069 A | 12/2007 |
| KR | 10-2012-0002255 A | 1/2012 |
| KR | 10-2013-0043536 A | 4/2013 |

* cited by examiner

*Primary Examiner* — Brent Swarthout
(74) *Attorney, Agent, or Firm* — Morgan, Lewis & Bockius LLP

(57) ABSTRACT

A method for warning a back side of a vehicle provided with a rear bumper multi carrier may include determining a carrier position by determining it is in a stowed state or drawing out state of a rear bumper multi carrier when a signal Reverse (R) step of a shift lever is produced, controlling ON or OFF operation of a detector of a rear side obstacle according to the stowed state or drawing out state of the carrier, and producing a warning signal when the rear side obstacle is detected in the detector operation controlling step.

4 Claims, 4 Drawing Sheets

METHOD FOR WARNING BACK SIDE OF VEHICLE PROVIDED WITH REAR BUMPER MULTI CARRIER

CROSS REFERENCE TO RELATED APPLICATION

The present application claims priority to Korean Patent Application Number 10-2014-0105700 filed Aug. 14, 2014, the entire contents of which is incorporated herein for all purposes by this reference.

BACKGROUND OF THE INVENTION

Field of the Invention

The present invention relates to a method for warning a back side of a vehicle provided with a rear bumper multi carrier, and more particularly, a method for warning a back side of a vehicle provided with a rear bumper multi carrier through which the warning can be prevented, which is produced by misidentifying the carrier that is drawn rearward or a loaded cargo as an obstacle when a vehicle travels reversely after loading cargo on a multi carrier that is drawn rearward.

Description of Related Art

Recently, the number of people have increased who enjoy leisure time by using a bicycle for their health, hobby and solving stress where a vehicle for leisure such as a Recreational Vehicle (RV) and a Sport Utility Vehicle (SUV) on which the bicycle can be loaded has been widely used to carry the bicycle to a target place.

Generally, a carrier for loading a bicycle is provided on a vehicle for leisure on which a bicycle can be loaded, and the carrier is usually stowed to be kept in a vehicle body and drawn out from the vehicle body, if necessary, and then a bicycle is to be loaded thereon.

The carrier of a drawing type is usually installed on a rear bumper or a luggage room to be used so as to avoid surrounding vehicles or obstacles during a driving of a vehicle, and further a sensor of a carrier rear side is installed to prevent for the carrier to contact a rear side obstacle when the carrier is drawn out rearward.

Accordingly, in a case where a vehicle travels reversely while a carrier is drawn rearward and a bicycle or cargo is loaded on the carrier that is drawn rearward, a controller of a vehicle controls whether to produce a warning signal by receiving signal from the sensor for a back side of the carrier according to whether a rear side obstacle is existed.

However, in a case where a general vehicle travels reversely while a carrier is drawn rearward and a bicycle or cargo is loaded on the carrier that is drawn rearward, a camera of a vehicle rear side (generally disposed toward a tail gate) and a sensor of a bumper rear side are operated, and thus the camera of a vehicle rear side and the sensor of a bumper rear side misidentify the carrier that is drawn rearward or the cargo that is loaded on the carrier as an obstacle, thereby producing an unnecessary warning signal.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for warning a back side of a vehicle provided with a rear bumper multi carrier of a rear side drawn out type, capable of preventing producing warning signal by misidentifying the carrier that is drawn rearward or cargo that is loaded on the carrier as a rear side obstacle when a vehicle travels reversely after loading cargo on the multi carrier that is drawn out rearward.

According to various aspects of the present invention, a method for warning a back side of a vehicle provided with a rear bumper multi carrier may include the steps of determining a carrier position by determining it is in a stowed state or drawing out state of a rear bumper multi carrier when a signal of Reverse (R) step of a shift lever is produced, controlling ON or OFF operation of a detector of a rear side obstacle according to the stowed state or drawing out state of the carrier, and producing a warning signal when the rear side obstacle is detected in the detector operation controlling step.

The detector of the rear side obstacle may be a camera of the vehicle rear side, a sensor of a bumper rear side, a camera of a carrier rear side, and a sensor of a carrier rear side.

When it is determined that the carrier is in a stowed state while the shift lever is disposed at R step, the camera of the vehicle rear side, the sensor of the bumper rear side and the camera of the carrier rear side may be controlled to be ON, and the sensor of the carrier rear side may be controlled to be OFF to prevent unnecessary power consumption.

When the carrier is determined to be in a drawing out state while the shift lever is at R step, the camera of the carrier rear side and the sensor of the carrier rear side may be controlled to be ON, and the camera of the vehicle rear side and the sensor of the bumper rear side may be controlled to be OFF so as to prevent the controller from misidentifying the carrier that is drawn out and cargo that is loaded on the carrier as the rear side obstacle.

When the rear side obstacle is detected within a detection region through one of the camera of the vehicle rear side, the sensor of the bumper rear side, and the camera of the carrier rear side that are operated to ON, the controller may control a warning producer to produce the warning signal.

When the rear side obstacle is detected within a detection region through one the camera of the carrier rear side and the sensor of the carrier rear side that are operated to ON, the controller may control the warning producer to produce the warning signal.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 and FIG. 2 are views illustrating an exemplary method for warning a back side of a vehicle provided with a rear bumper multi carrier according to the present invention in which FIG. 1 is a perspective view showing a stowed state of the carrier and FIG. 2 is a perspective view showing a drawing out state of the carrier.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
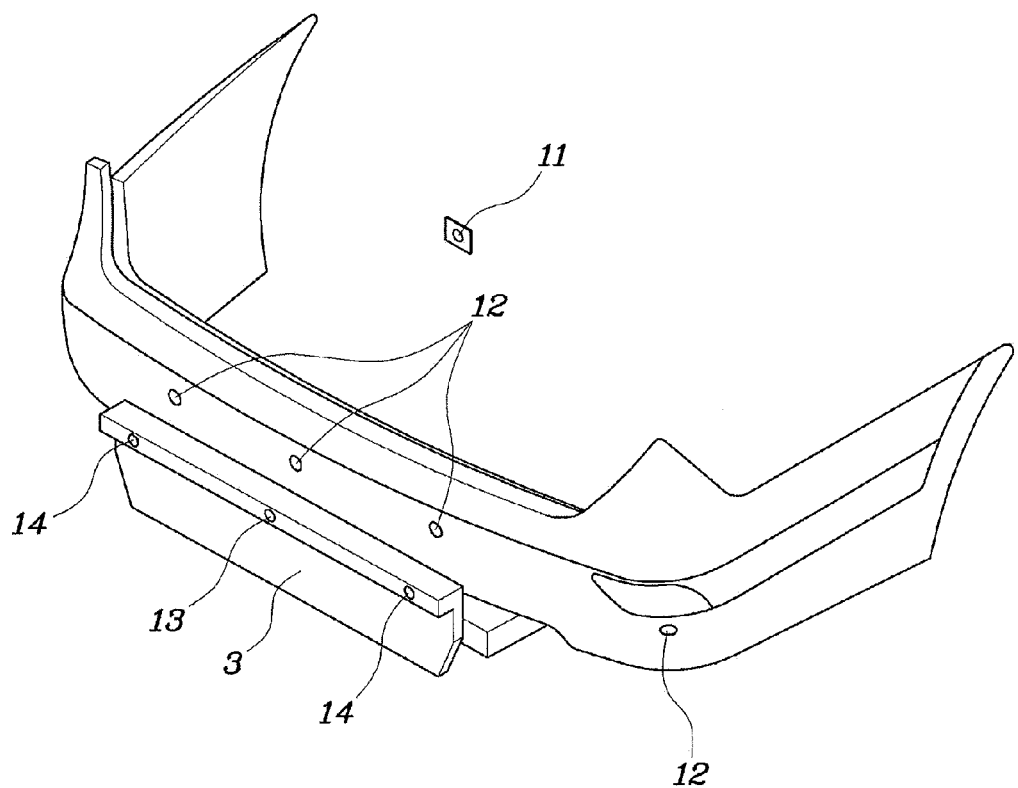
Figure 2:
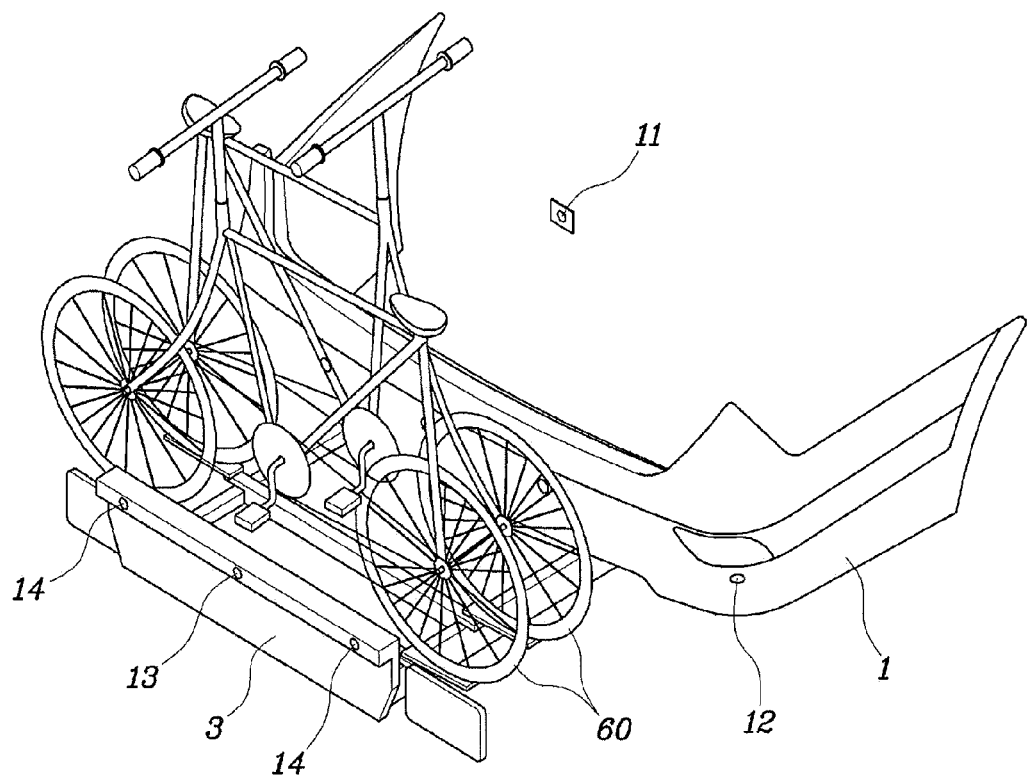
Figure 3:
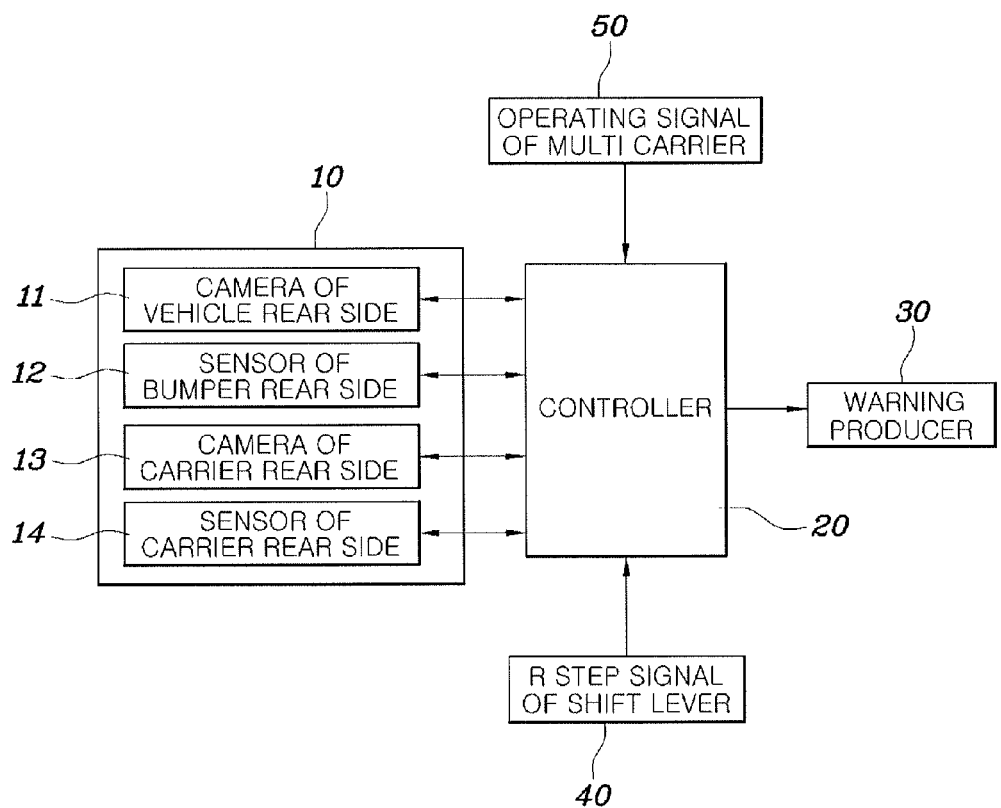
FIG. 3 and FIG. 4 are flow charts illustrating the exemplary method for warning the back side of the vehicle provided with the rear bumper multi carrier according to the present invention.
Figure 4:
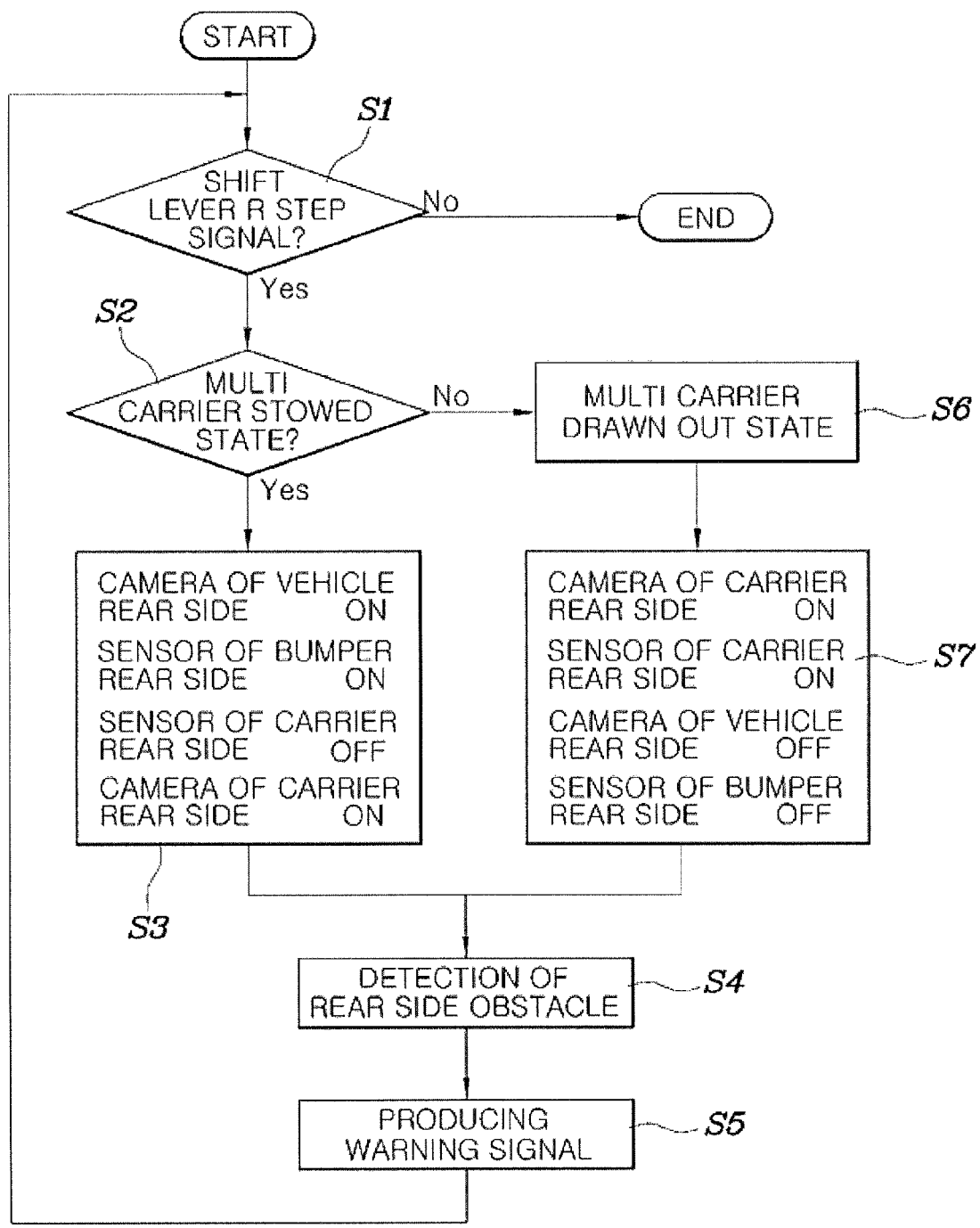

The present invention relates to a technology of a method for warning a back side of a vehicle provided with a rear bumper multi carrier and includes a detector 10 for detecting a rear side obstacle, a controller 20 and a warning producer 30 so as to implement the technology, as shown in FIG. 1, FIG. 2, FIG. 3, and FIG. 4.

The detector of a rear side obstacle 10 is provided with a camera of a vehicle rear side 11 that is generally installed on a tail gate or a tail gate garnish, a plurality of sensors of a bumper rear side 12 that are installed on a rear bumper 1, a camera of a carrier rear side 13 that is installed on a rear bumper multi carrier 3, and a sensor of a carrier rear side 14.

The controller 20 is a Body Control Module (BCM) and it sends and receives signals to/from the detector of a rear side obstacle through a Local Interconnect Network (LIN) communication.

The warning producer 30 produces a warning sound and warning image to be recognized acoustically and visually by a driver.

Further, the present invention aims at controlling the operation of the warning producer according to whether the rear obstacle exists when a vehicle travels reversely, and to this end the controller 20 may be configured to receive a signal of R (reverse) step of a shift lever 40 from Transmission Control Unit (TCU) through a Controller Area Network (CAN) communication.

Further, the controller 20 according to various embodiments of the present invention may be configured to receive an operation state signal of a rear bumper multi carrier 50 (stowed state signal or drawing out state signal) when a vehicle starts-ON.

Hereinafter, a method for warning a back side of a vehicle provided with a rear bumper multi carrier according to various embodiments of the present invention will be described in detail.

The method for warning a back side of a vehicle provided with a rear bumper multi carrier may include the steps of determining a carrier position by determining it is in a stowed state or drawing out state of a rear bumper multi carrier 3 when a signal of Reverse (R) step of a shift lever is produced; controlling ON or OFF operation of a detector of a rear side obstacle 10 according to the stowed state or drawing out state of the carrier 3; and producing a warning signal when the rear side obstacle is detected in the detector operation controlling step.

That is, when it is determined that the carrier 3 is in a stowed state while the shift lever is disposed at R step, the camera of a vehicle rear side 11, the sensor of a bumper rear side 12 and the camera of a carrier rear side 13 are controlled to be ON and the sensor of a carrier rear side 14 is controlled to be OFF to prevent unnecessary power consumption.

Here, when the rear side obstacle is detected within a detection region through any one of the camera of a vehicle rear side 11, the sensor of a bumper rear side 12 and the camera of a carrier rear side 13 that are operated to ON, the controller 20 controls the warning producer 30 to produce warning signal.

Further, when the carrier 3 is determined to be in a drawing out state while the shift lever is at R step, the camera of a carrier rear side 13 and the sensor of a carrier rear side 14 are controlled to be ON, and the camera of a vehicle rear side 11 and the sensor of a bumper rear side 12 are controlled to be OFF so as to prevent the controller 20 from misidentifying the carrier 3 that is drawn out and the cargo (bicycle) 60 that is loaded on the carrier as a rear side obstacle.

Here, when the rear side obstacle is detected within a detection region through one of the camera of a carrier rear side 13 and the sensor of a carrier rear side 14 that are operated to ON, the controller 20 controls the warning producer 30 to produce warning signal.

Hereinafter, the operation of various embodiments of the present invention will be described.

When the signal of R (reverse) step of a shift lever is transmitted to the controller 20 while a vehicle starts-ON (S1), the controller 20 determines whether the rear bumper multi carrier 3 is in a stowed state or a drawing out state.

Here, the controller 20 controls the camera of a vehicle rear side 11 and the sensor of a bumper rear side 12 to be ON and on the contrary the sensor of a carrier rear side 14 to be OFF so as to prevent unnecessary consumption of power (S3), among the detectors 10 of a rear side obstacle, when the controller 20 determines that the carrier 3 is in a stowed state (S2).

At this time, when the rear side obstacle is detected within a detection region through any one of the camera of a vehicle rear side 11, the sensor of a bumper rear side 12 and the camera of a carrier rear side 13 that are operated to ON (S4), the controller 20 controls the warning producer 30 to produce warning signal (S5).

Further, when the controller 20 determines that the carrier 3 is in a drawing state after S1 (S6), the controller 20 controls the camera of a carrier rear side 13 and the sensor of a carrier rear side 14 to be ON for a back side of a vehicle to be safe and the camera of a vehicle rear side 11, the sensor of a bumper rear side 12 to be OFF so as to prevent the controller from misidentifying the carrier 3 that is drawn out and the cargo (bicycle) 60 that is loaded on the carrier as a rear side obstacle.

At this time, when the rear side obstacle is detected within a detection region through any one of the camera of a vehicle rear side 11, the sensor of a bumper rear side 12 and the camera of a carrier rear side 13 that are operated to ON (S4), the controller 20 controls the warning producer 30 to produce warning signal (S5).

According to various embodiments of the present invention as described above, when a vehicle travels reversely, which is provided with a rear bumper multi carrier 3, a rear side obstacle within a detection region can be detected in various ways using the camera of a vehicle rear side 11, the sensor of a bumper rear side 12 and the camera of a carrier rear side 13 while the carrier 3 is stowed, and thus the vehicle can travel reversely with more safety.

Further, when a vehicle travels reversely while the carrier 3 is stowed, power of the sensor of a carrier rear side 14 is OFF, thereby preventing unnecessary power consumption.

Additionally, according to various embodiments of the present invention, when a vehicle travels reversely while the carrier 3 is drawn out, a rear side obstacle within a detection region can be detected only using the camera of a carrier rear side 13 and the sensor of a carrier rear side 14 that are not blocked in sight by the cargo 60 that is loaded on the carrier 3, and the powers of the camera of a vehicle rear side 11 and the sensor of a bumper rear side 12 that are blocked in sight by the carrier 3 that is drawn out or the cargo 60 that is loaded on the carrier 3 are OFF, thereby preventing the controller 20 from misidentifying the carrier 3 that is drawn out or the cargo (bicycle) 60 that is loaded on the carrier 3 as the rear side obstacle and the warning producer from being mal-operated.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for warning a back side of a vehicle provided with a rear bumper multi carrier comprising:
    determining a position of the rear bumper multi carrier by determining the rear bumper multi carrier to be in a stowed state or drawing out state when a signal of Reverse (R) step of a shift lever is produced;
    controlling, by a controller, ON or OFF operation of a detector configured to detect a rear side obstacle according to the stowed state or drawing out state of the rear bumper multi carrier; and
    producing a warning signal when the rear side obstacle is detected by the detector,
    wherein the detector of the rear side obstacle is a camera of the vehicle rear side, a sensor of a bumper rear side, a camera of a carrier rear side, and a sensor of a carrier rear side, and
    wherein when the rear bumper multi carrier is determined to be in the drawing out state while the shift lever is at the R step, the camera of the carrier rear side and the sensor of the carrier rear side are controlled to be ON, and the camera of the vehicle rear side and the sensor of the bumper rear side are controlled to be OFF.

2. The method for warning the back side of the vehicle provided with the rear bumper multi carrier of claim 1, wherein when it is determined that the rear bumper multi carrier is in the stowed state while the shift lever is disposed at the R step, the camera of the vehicle rear side, the sensor of the bumper rear side and the camera of the carrier rear side are controlled to be ON, and the sensor of the rear bumper multi carrier rear side is controlled to be OFF to prevent unnecessary power consumption.

3. The method for warning the back side of the vehicle provided with the rear bumper multi carrier of claim 2, wherein when the rear side obstacle is detected within a detection region through one of the camera of the vehicle rear side, the sensor of the bumper rear side, and the camera of the carrier rear side that are operated to ON, the controller controls a warning producer to produce the warning signal.

4. The method for warning the back side of the vehicle provided with the rear bumper multi carrier of claim 1, wherein when the rear side obstacle is detected within a detection region through one of the camera of the carrier rear side and the sensor of the carrier rear side that are operated to ON, the controller controls the warning producer to produce the warning signal.

* * * * *